United States Patent Office 3,367,982
Patented Feb. 6, 1968

3,367,982
FLUOROHYDRINS AND A METHOD FOR THEIR PREPARATION
Richard F. Merritt, Huntsville, Ala., assignor to Rohm & Haas Company, Philadelphia, Pa., a corporation of Delaware
No Drawing. Filed June 2, 1965, Ser. No. 460,821
6 Claims. (Cl. 260—633)

This invention deals with specific fluorohydrins as new compositions of matter. It further deals with a method for the preparation of these fluorohydrins.

While halohydrins other than fluorohydrins are known in the art, the fluorohydrins of this invention have never been prepared. The prior art methods for preparing the known halohydrins other than fluorohydrins cannot be used for the preparation of fluorohydrins.

In order to prepare the fluorohydrins of this invention, one must adhere rigidly to the process of this invention to be described hereinafter.

The fluorohydrins of this invention may be represented by the formula

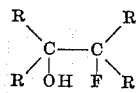

where the R's represent alkyl groups having a total of up to 24 carbon atoms. Preferably, the R groups are lower alkyl, that is alkyl of 1 to 4 carbon atoms, and most preferentially methyl. Typically, the R groups may individually stand for methyl, ethyl, isopropyl, butyl, hexyl, 2-ethylhexyl and the like.

The fluorohydrins of this invention are prepared by reacting oxygen difluoride with a compound having the formula

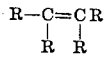

at a temperature range of −80° C. to 0° C., preferably −80° to −40° C. The higher molecular weight olefin reactants generally require a somewhat higher reaction temperatrue, whereas when the R symbols each represent methyl or a lower alkyl, the preferred range is quite acceptable for high yields and safe reaction conditions.

Typical olefin reactants include 2,3-dimethyl-2-butene, 2,3-dimethyl-2-octene, 3,4-diethyl-3-hexene, 5,6-dibutyl-5-decene, 3-ethyl - 4 - butyl-3-octene, 3-ethyl-4-hexyl-3-decene, 3-ethyl-4-octyl-3-dodecene, and 5-propyl-6-methyl-5-tetradecene.

The reaction is strongly exothermic in nature and the lower reaction temperatures are employed for the purposes of safety. It is possible in certain continuous reaction systems to use temperatures as high as 25° C. with reasonable safety by employing a flow of reactants in low concentrations.

The oxygen difluoride and olefin reactant react in a substantially 1:1 ratio, but it is preferred generally to employ an excess of oxygen difluoride to obtain maximum benefits. The excess oxygen difluoride is readily removed at the conclusion of the reaction by low temperature vacuum distillation.

It is important that the oxygen difluoride be added gradually to the olefin. As has been pointed out previously, the reaction is exothermic in nature and the gradual addition of oxygen difluoride is necessary in the direction of control and safety. Furthermore, the olefin cannot be added to the oxygen difluoride without the hazards of explosions. Hence, one must adhere strictly to this aspect of the invention. It is preferred to add the oxygen difluoride at a rate substantially commensurate with its rate of reaction in order to control the reaction and maximize yields.

Subatmospheric pressures are employed with a preference of no greater than 700 mm. It is preferred to use pressures in the range of 100 to 500 mm.

While a solvent is not absolutely required, particularly with the lower molecular weight olefin reactants, it is frequently desirable to employ an inert volatile solvent in order to bring the reactants into desired proximity while controlling their concentrations. In order to be inert, the solvent must be saturated and have no acids or basic sites.

Typical solvents are fluorotrichloromethane, carbon tetrachloride, pentane, diethyl ether and others.

The products of the present invention are useful as herbicides for both monocotyledonous and dicotyledonous plants when applied according to standard technique and in usual amounts. These products are also useful as insecticides for household insects and grain insects when applied according to standard techniques and in usual amounts. The compounds of this invention may be heated alone or heated in the presence of alkali to form 1,3-dienes and hydrogen fluoride, both of which have known uses.

The invention can be more fully understood from the following examples which are offered by way of illustration and not by way of limitation.

*Example 1*

One gram (12 mmoles) of tetramethyl ethylene dissolved in 10 ml. of fluorotrichloromethane is slurried with two grams of sodium fluoride. The mixture is degassed and adjusted to −78° C. The mixture is stirred while 12 mmoles of oxygen difluoride (400 mm.) is admitted to the reactor. Within two hours, the oxygen difluoride is completely consumed. The reaction mixture is again outgassed at −78° C. to insure complete removal of the excess oxygen difluoride and then warmed to 25° C. under a blanket of nitrogen. Diethyl ether (10 ml.) is added and the sodium fluoride removed by filtration. The ether and the fluorotrichloromethane are slowly removed at 25° C. leaving 1.3 grams of crude yellow oil. The oil is immediately diluted with 2 ml. of diethyl ether and analyzed by vapor phase chromatography (SF 96/80° C.). The product is identified by infrared and NMR spectra.

There is obtained in a yield of 76% a colorless liquid identified as tetramethyl ethylene fluorohydrin. The infrared spectrum contained bands for OH (2.77 mµ), C—CH₃ (7.26 mµ) and C—F (8.5–8.6 mµ).

The proton NMR spectrum is a six-proton singlet at 1.8δ.

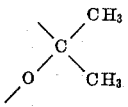

and a six-proton doublet (J=23 cps.) centered at 1.33δ

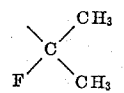

The hydroxyl proton is found at 2.36δ. The fluorine NMR spectrum consisted of a septet centered at +2887 cps. from TFA and is indicative of fluorine split (J=23 cps.) by six equivalent adjacent protons. The product contained 59.09% carbon (59.97% theoretical) and 10.81% hydrogen (10.90% theoretical).

I claim:
1. A composition of matter represented by the formula

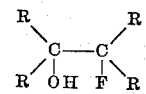

where the R's represent alkyl groups having a total of up to 24 carbon atoms.

2. A compound according to claim 1 wherein the R groups are each alkyl of 1 to 4 carbon atoms.

3. A compound of claim 1 wherein the R groups are methyl.

4. A method for the preparation of a compound having the formula

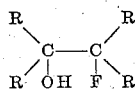

comprising reacting oxygen difluoride with a compound having the formula

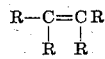

at a temperature range of about −80° C. to 0° C. and at subatmospheric pressure wherein the oxygen difluoride is added to the olefin reactants, wherein the R's represent alkyl groups having a total of up to 24 carbon atoms.

5. A method according to claim 4 wherein the temperature is about −80° to −40° C. and the oxygen difluoride is employed in excess.

6. A method according to claim 4 wherein the reaction is conducted in the presence of an inert volatile solvent and at sub-atmospheric pressures of no greater than 700 mm.

References Cited

Merritt et al.: J. Org. Chem., vol. 30, pp. 328–331 (1965).

LEON ZITVER, *Primary Examiner.*

N. J. KING, H. T. MARS, *Assistant Examiners.*